United States Patent
Droz

(10) Patent No.: US 7,083,083 B2
(45) Date of Patent: Aug. 1, 2006

(54) PORTABLE INFORMATION CARRIER WITH TRANSPONDERS

(75) Inventor: François Droz, La Chaux-de-Fonds (CH)

(73) Assignee: NagraID S.A., La Chaux-de-Fonds (CH)

(*) Notice: Subject to any disclaimer, the term of this patent is extended or adjusted under 35 U.S.C. 154(b) by 0 days.

(21) Appl. No.: 10/931,738

(22) Filed: Sep. 1, 2004

(65) Prior Publication Data
US 2005/0236489 A1   Oct. 27, 2005

(30) Foreign Application Priority Data
Apr. 27, 2004   (CH) .................................. 0732/04

(51) Int. Cl.
*G06F 17/00* (2006.01)
(52) U.S. Cl. .................. 235/375; 235/385; 235/383; 343/841; 343/702; 361/816; 361/818
(58) Field of Classification Search ............... 235/375, 235/385, 383; 343/841, 702; 361/816, 818; 257/660; 713/185, 184
See application file for complete search history.

(56) References Cited

U.S. PATENT DOCUMENTS

| | | | |
|---|---|---|---|
| 4,774,148 A | | 9/1988 | Goto |
| 5,031,027 A | * | 7/1991 | Dorinski et al. ............ 257/660 |
| 5,587,578 A | * | 12/1996 | Serra ........................... 235/492 |
| 6,121,544 A | | 9/2000 | Petsinger |
| 6,176,425 B1 | | 1/2001 | Harrison |
| 6,344,155 B1 | | 2/2002 | Kitahara |
| 2003/0016519 A1 | * | 1/2003 | Bachman .................... 361/818 |
| 2003/0080917 A1 | * | 5/2003 | Adams et al. .............. 343/841 |
| 2004/0160369 A1 | * | 8/2004 | Wong et al. ................ 343/702 |
| 2004/0240192 A1 | * | 12/2004 | Seidler ........................ 361/816 |
| 2005/0189635 A1 | * | 9/2005 | Humpston et al. ......... 257/678 |

FOREIGN PATENT DOCUMENTS

| | | |
|---|---|---|
| DE | 197 21 057 | 11/1998 |
| DE | 102 33 927 | 2/2004 |
| JP | 2003031041 | * 1/2003 |

* cited by examiner

*Primary Examiner*—Steven S. Paik
*Assistant Examiner*—Allyson N Trail
(74) *Attorney, Agent, or Firm*—Sturm & Fix LLP

(57) ABSTRACT

The aim of this invention is to propose a portable information carrier equipped with a transponder capable of being activated and deactivated during the use of said information carrier without having recourse to a specific device for actuation. This aim is reached by a portable information carrier comprising at least two substantially planar parts articulated to each other forming an assembly in which one part can be superimposed on the other, the first part includes a transponder arranged on the plane of said part, the second part includes a shielding element that extends over all or part of said part, said transponder intended to be read by means of a suitable reader that transmits an electromagnetic signal activating the transmission of a response from said transponder, wherein said transponder of the first part is positioned facing the shielding element of the second part when both parts are superimposed preventing the activation of the transponder by absorption of the signal transmitted by the reader, said activation being carried out when said parts are moved aside from each other, letting appear the transponder distant from the shielding element.

12 Claims, 3 Drawing Sheets

PORTABLE INFORMATION CARRIER WITH TRANSPONDERS

FIELD OF THE INVENTION

The object of this invention is a particular application where transponders are integrated into a portable information carrier such as a document including several sheets such as, for example, a passport, a permit, an attestation for a member of an association or other types of identity document.

BACKGROUND OF THE INVENTION

A transponder or "RFID Tag" is an electronic element comprising at least one chip connected to an antenna including a memory in which digital data is stored. The content of this memory can be consulted or read with the help of a suitable reader that transmits an electromagnetic signal intended to be picked up by the antenna of the transponder. This signal provides the energy necessary for the activation of the chip that returns to the reader, via the same antenna, a response signal containing the data stored in the memory of the chip.

Except the contactless chip cards, a conventional transponder application consists in integrating them into labels that can be stuck or attached to any object (goods in a store, spare parts in warehouse, luggage, etc.).

Thanks to their reduced thickness and in an aim to provide protection against counterfeiting, transponders can also be directly imbedded into the material forming the objects such as valuable documents, banks notes, compact discs, badges, cards etc.

When several transponders are fixed or inserted into an object, their reading can become more difficult because, being supplied simultaneously by the electromagnetic field of the reader, they also respond simultaneously. In order to distinguish the response of one transponder from that of another, it is necessary to isolate them electromagnetically by means of shielding elements.

The document U.S. Pat. No. 6,176,425 describes a system where a set of transponders located on an object is managed by a reader that is capable of sequentially picking up the data originating from each transponder. Said transponders have an individual reading zone in which it is possible to read the data stored in the transponder in question.

In order to select a given transponder, movable shielding elements placed in the vicinity of the transponder can be positioned in different ways. According to their position, these shielding elements allow either to direct the signal emitted by the antenna of the transponder in a given direction without overlapping into the reading area of another transponder, or to mask the transponders to let inactive during the reading of one transponder alone.

These shielding elements known in the form of electromagnetic conductive sheets have the capacity to absorb the electromagnetic energy transmitted by the reader in order to block the activation of the transponder chip. Embodiment examples of such sheets and their composition are described in the documents U.S. Pat. Nos. 4,774,148 and 6,344,155.

SUMMARY OF THE INVENTION

The aim of this invention is to propose a portable information carrier equipped with a transponder capable of being activated and deactivated during the use of said information carrier without having recourse to a specific device for actuation.

This aim is reached by a portable information carrier comprising at least two substantially planar parts articulated to each other forming an assembly in which one part can be superimposed on the other, the first part includes a transponder arranged on the plane of said part, the second part includes a shielding element that extends over all or part of said part, said transponder intended to be read by means of a suitable reader that transmits an electromagnetic signal activating the transmission of a response from said transponder, characterized in that said transponder of the first part is positioned facing the shielding element of the second part when both parts are superimposed to prevent the activation of the transponder by absorption of the signal transmitted by the reader, said activation is carried out when said parts are moved aside from each other, letting appear the transponder distant from the shielding element.

In a preferred embodiment, the portable information carrier according to the invention consists in a booklet formed by a sheet folded into two equal parts, one of which includes a transponder that is usually integrated into said sheet. The other part includes a shielding element that occupies an area whose surface corresponds at least to that occupied by the transponder on the first sheet. This shielding element is made up of an electromagnetic conductive sheet that forms a layer integrated into the sheet for example. When both sheets are folded, that is to say superimposed one on the other, the transponder of the first sheet faces the shielding element of the second sheet.

An electromagnetic conductive sheet represents here a homogeneous or inhomogeneous sheet (wire netting for example) absorbing both the electric field and the magnetic field transmitted by the transponder reading device. The material of this sheet will be chosen according to the frequency of the electromagnetic field. In fact, the more the frequency increases, the greater the ratio of the magnetic field to be absorbed will be in relation to the electric field and inversely.

When the booklet is closed, the transponder cannot be activated since the shielding situated under the transponder absorbs the energy transmitted by the reader, while, when the booklet is opened, the shielding is placed beside the transponder that can thus easily be read.

According to an embodiment of the invention, each sheet of the booklet includes a transponder and a shielding element positioned in such a way that when the booklet is closed, the transponders are placed on a corresponding shielding element of the sheet opposite to that carrying said transponder. In this case, when the booklet is opened, each transponder can be read independently one from the other, the shielding elements being distant from the transponders.

According to another embodiment, the booklet includes a plurality of sheets joined in the same way as the pages of a book or of a review. Each sheet includes a transponder that can be read individually without the transponders of the preceding sheets being activated. This reading is carried out when the booklet is opened in order to present the transponder of the sheet to be read in a like in the minimal embodiment with two sheets. The hidden transponders of the superimposed sheets are deactivated by a shielding element integrated into the sheet covering said transponders.

BRIEF DESCRIPTION OF THE DRAWINGS

The invention will be better understood thanks to the following detailed description that refers to the enclosed drawings that are given as a non-limitative example, in which.

DETAILED DESCRIPTION OF THE INVENTION

Figure 1:
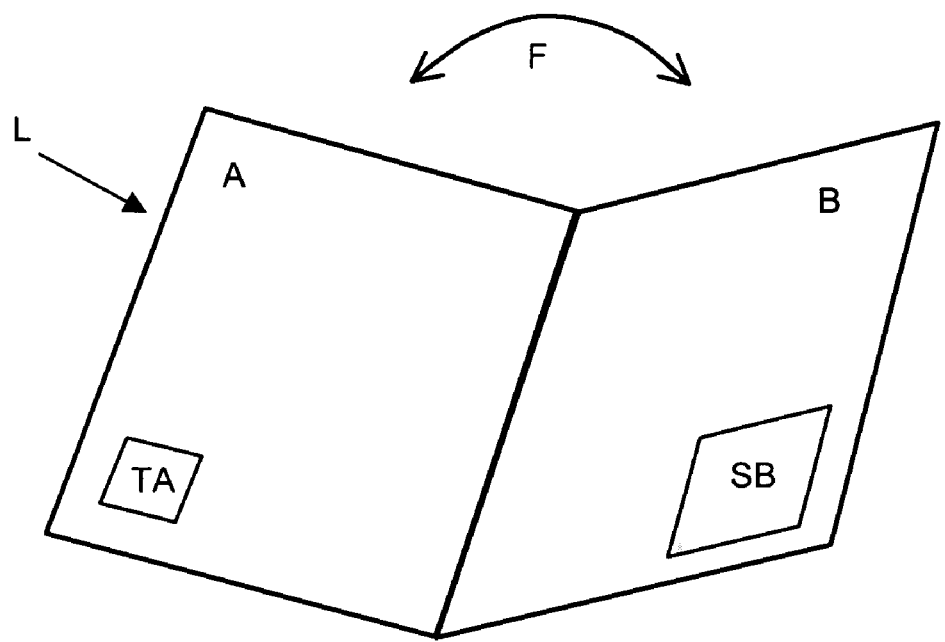
FIG. 1 shows a view in perspective of an opened booklet with two articulated sheets in which one includes a transponder and the other a shielding element.

FIG. 1 shows a general view of a booklet (L) comprising two sheets (A) and (B). The first sheet (A) includes a transponder (TA) and the second sheet (B) includes a shielding element (SB). The sheets (A, B) are joined either by a fold or any other type of hinge allowing an easy articulation to open and close the booklet (L) according to the arrow (F).

Figure 2:
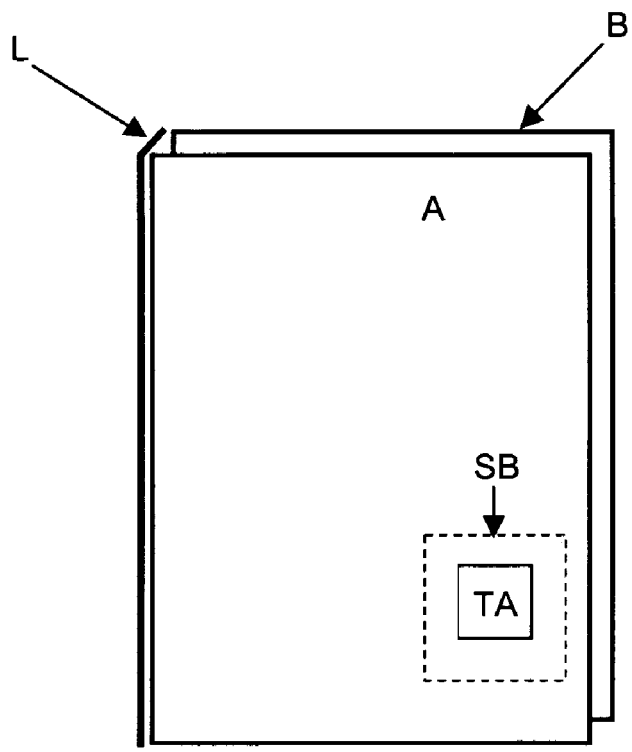
FIG. 2 illustrates the booklet of FIG. 1 closed showing the transponder placed on the shielding element.

The transponder (TA) and the shielding element (SB) can either be adhered onto one of the faces of the sheets, or integrated or imbedded into the material according to a preferred variant offering increased security. Their position on the sheets (A, B) depends on one hand on the characters and/or designs printed on said sheets (A, B) and on the other hand on their respective functions. In fact, the transponder (TA) is positioned on the sheet (A) in such a way that the shielding element (SB) situated on the sheet (B) is superimposed when the booklet (L) is closed as shown in FIG. 2. In other words, the transponder (TA) and the corresponding shielding element (SB) are symmetrically placed on both parts of the axis formed by the hinge that links the sheets (A) and (B) when the booklet (L) is flat opened out.

The surface occupied by the shielding element on the sheet (B) depends on that occupied by the transponder on the sheet (A) and on the electromagnetic energy absorption power of the materials which constitute said shielding element.

The role of this shielding element (SB) is to block the reading of the transponder (TA) when the booklet is closed. In this case, the shielding element (SB) is under the transponder (TA) at a small distance from the latter. The electromagnetic signal transmitted by a transponder reader thus absorbed or strongly attenuated by the shielding element (SB) becomes insufficient to supply the transponder (TA) with the energy necessary for the issue of its response. Therefore, it is impossible to read the transponder (TA) as long as the booklet (L) remains closed. Once the opened booklet is placed flat out, the shielding element is outside the reading area of the transponder and thus has no effect on the signal transmitted by the reader that in this way can supply normally the transponder (TA) allowing it to respond in the appropriate way.

According to an embodiment of the invention, both sheets (A, B) can be provided with a transponder. In this case, a corresponding shielding element is placed on both parts of the hinge linking the two sheets in such a way that, when the booklet is closed, each transponder is covered by its corresponding element. It is only on the opening of the booklet that it is possible to read each transponder one after the other without the signal of the reader being altered by one of the shielding elements.

Figure 3:
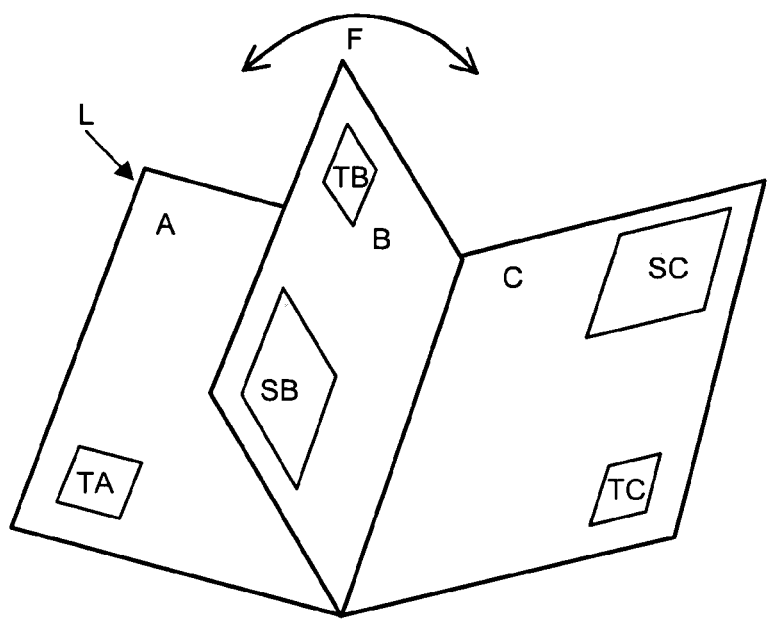
FIG. 3 shows a view in perspective of an opened booklet with three sheets each including a transponder and the corresponding shielding elements.

According to another embodiment, the booklet can have a plurality of sheets as shown in FIG. 3 where three sheets (A), (B) and (C) are linked together by a hinge. According to the number of sheets of the booklet, this hinge can be arisen in several forms such as paper-clips, rings, a spiral or gluing in the same way that a book bounding, etc.

In the example disclosed in FIG. 3, each of the three sheets (A, B, C) includes a transponder (TA, TB, TC). The shielding elements (SB, SC) are arranged in such a way as to allow the selective reading of the transponders (TA, TB, TC) when the booklet is opened by presenting two sheets at a time. On the contrary, when the booklet is closed none of the transponders (TA, TB, TC) can be read because of the shielding elements (SB, SC) that are superimposed on said transponders (TA, TB, TC).

The first sheet (A) of the booklet (L) includes a transponder (TA), the second sheet (B) includes a transponder (TB) and a shielding element (SB) positioned symmetrically to the transponder (TA) of the first sheet (A) regarding the axis of the hinge linking the sheets. The third sheet (C) includes a transponder (TC) positioned symmetrically to the shielding element (SB) of the second sheet (B) and a shielding element (SC) also placed symmetrically to the transponder (TB) of the second sheet (B).

Figure 4:
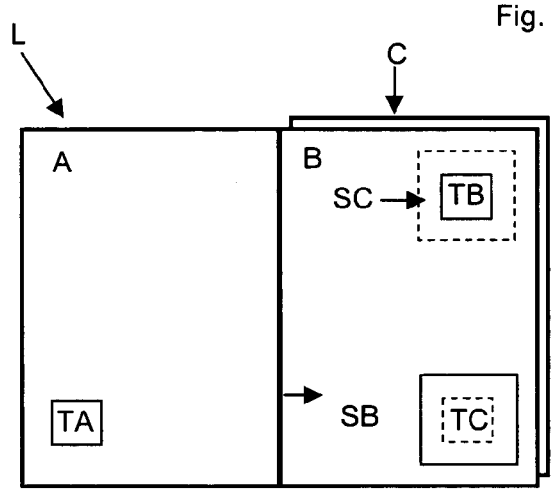
FIG. 4 shows a plan view of the booklet of FIG. 3 with the two first sheets opened.

FIG. 4 shows the booklet (L) in FIG. 3 opened in a flat position at the first two sheets (A) and (B). The transponder (TA) of sheet (A) can only be read because the transponder (TB) of sheet (B) is placed on the shielding element (SC) situated on the third sheet (C) covered by the second sheet (B). The transponder (TC) of the third sheet (C) cannot be read either since it is covered by the shielding element (SB) of the second sheet (B).

Figure 5:
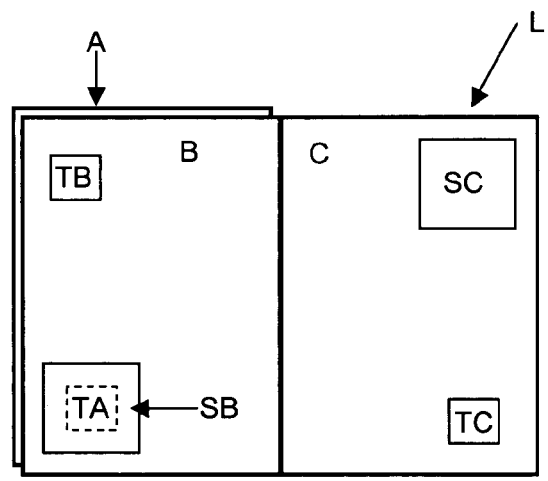
FIG. 5 shows a plan view of the booklet of FIG. 3 with the two last sheets opened.

FIG. 5 shows the booklet (L) opened in a flat position at the second and third sheets (B, C). Here, the transponders (TB) and (TC) of sheets (B) and (C) respectively can be read as they are not placed on the shielding elements. Only the transponder (TA) of the first sheet (A) cannot be read as it is covered by the shielding element (SB) of the second sheet (B).

Therefore to read successively the transponders (TA; TB, TC) carried by each sheet (A; B; C) of the booklet (L), it is sufficient to turn the pages made up of said sheets one after the other in order to present them opened two at a time to the reader.

Figure 6:
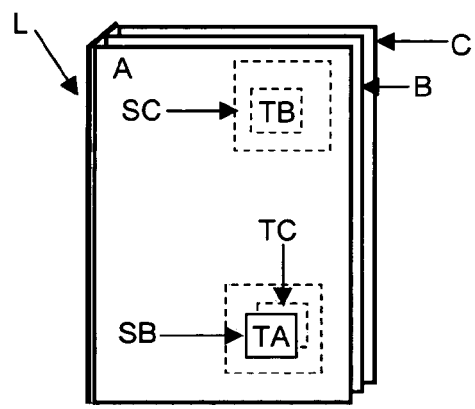
FIG. 6 illustrates the booklet of FIG. 3 closed showing the different transponders placed on their respective shielding elements.

FIG. 6 shows the booklet (L) closed where none of the transponders (TA, TB, TC) can be read from either of the outer faces of the booklet (L). In fact, each transponder (TA, TB, TC) is covered by a shielding element (SB, SC). The transponder (TA) of the first sheet (A) is positioned on the shielding element (SB) of the second sheet (B) just as the transponder (TC) of the third sheet (C). The transponder (TB) of the second sheet (B) is positioned on the shielding element (SC) of the third sheet (C).

This invention can be applied to all documents that include several sheets secured by transponders such as a passport or a valuable document. The transponders containing the digital data related to the written content of the document, for example, allow the prevention of any type of fraud or falsification. The selective reading of the transponders simply by turning the pages of the document becomes advantageous in the automated systems in charge, for example, to compare an optical reading of the content of the pages of the document with that stored in the memories of transponders.

According to an embodiment with an additional security level, the document can also be provided with an identification marking on the shielding elements that extend on all or part of a sheet. This marking can consist in a bar code, perforations, printed graphics or characters, a hologram or a kinegram, etc or also a combination of these types of marking.

The sheets of the information carrier according to the invention can be made of several kinds of material, preferably not metallic, which do not affect the functioning of the transponders when they are activated. Their shape and size, length, width and thickness can also be variable and adapted according to the use of the information carrier as for example, a card, a valuable document, a portfolio, a badge or any other object including at least two articulated parts that can be superimposed on all or part of their surface.

Figure 7:
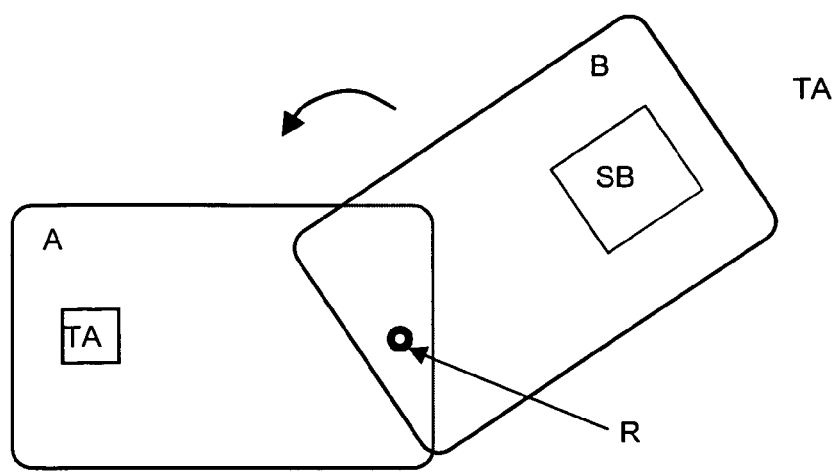
FIG. 7 represents an alternative where two parts of an information carrier are articulated according to a rotating axis perpendicular to said parts.

FIG. 7 shows an example of an information carrier in the form of a card or a badge for example constituted of two parts or sheets (A, B) articulated according to a rotation axis (R) perpendicular to said parts. This axis (R) is preferably placed in the vicinity of the edge of the sheets (A, B) and can be constituted, according to the thickness of the sheets, by an eyelet, a screw or a joining pin or any other attachment means. This allows the rotation of two sheets (A, B) one on top of the other in order to move aside or superimpose them.

Figure 8:
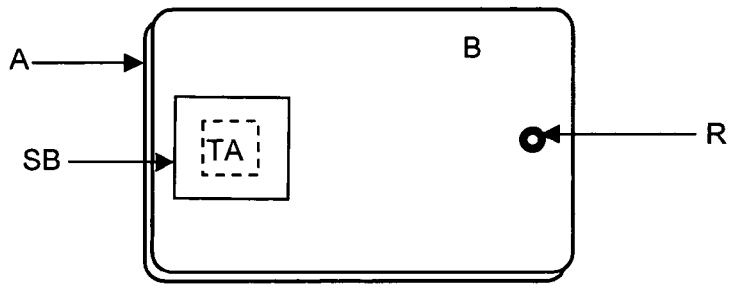
FIG. 8 shows the information carrier of FIG. 7 with its two articulated parts superimposed.

When both parts (A, B) or sheets are moved aside (FIG. 7) the transponder (TA) of the first sheet (A) can be read. When the second part or sheet (B) superimposes the first (A), as shown in FIG. 8, the transponder (TA) is covered by the shielding element (SB) of the second sheet (B) thus preventing the reading of said transponder (TA).

This embodiment can be applied to a credit card or an identification card in order to avoid the reading of the transponder without the knowledge of the user carrying the card and passing into the vicinity of a reader. In fact, to activate the reading, the carrier of the card must take his card and open it by turning one of two sheets in order to free the transponder before presenting it to the reader.

Figure 9:
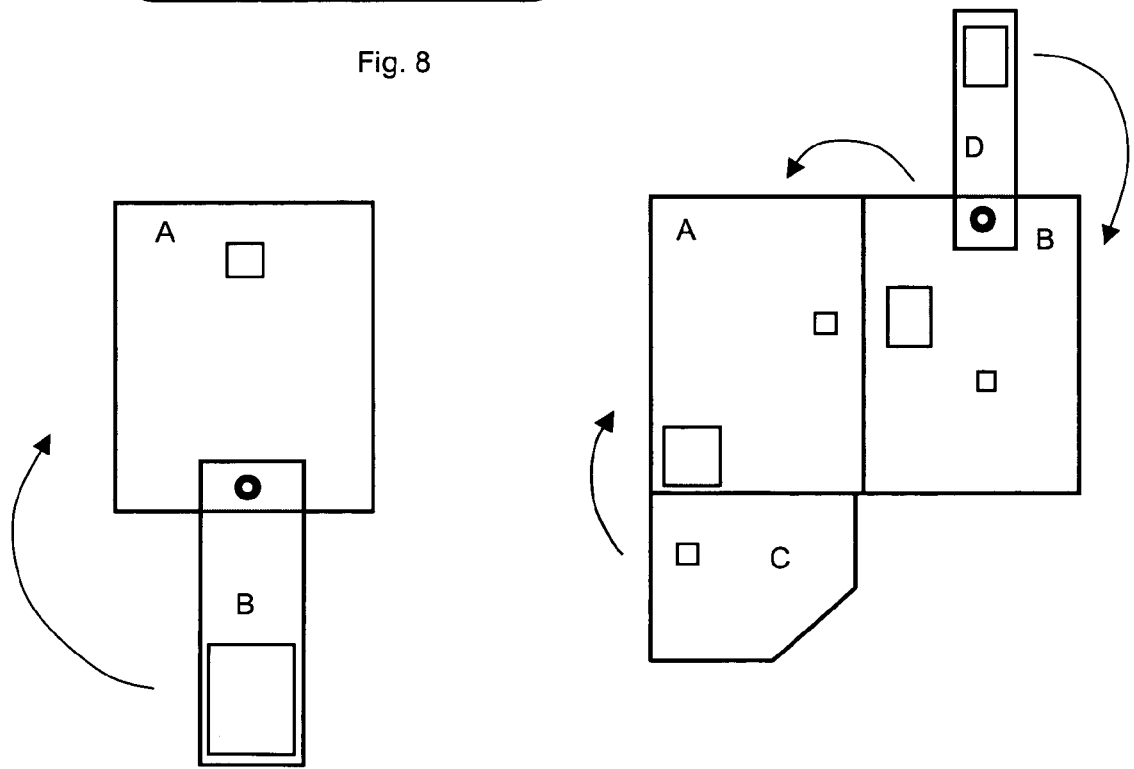
FIG. 9 shows an example of an information carrier where two sheets of different sizes are articulated according to a rotating axis.

Of course, regardless of the configuration of the articulation between the two sheets (hinge type or joining pin type) the latter can be of different shapes and sizes by being adapted to the size and the positioning of the transponder and/or the shielding element. FIG. 9 shows an example in which the sheet B carrying the shielding element has a smaller surface than that of the sheet A carrying the transponder.

Figure 10:
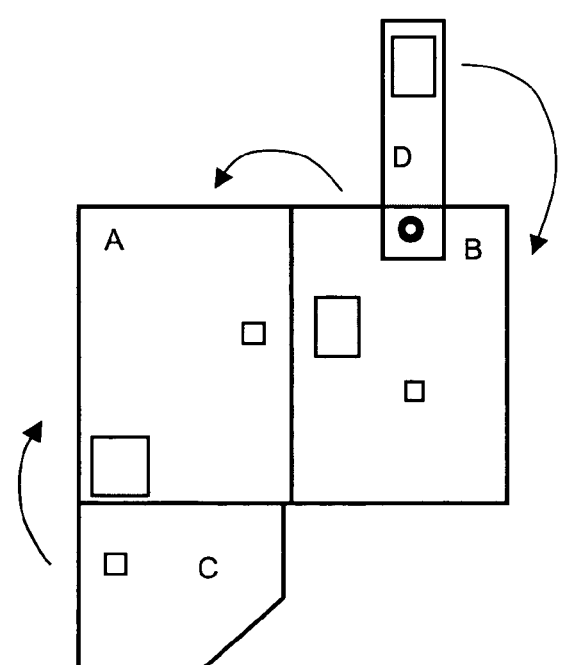
FIG. 10 shows an example of an information carrier where four sheets of different shapes and sizes are articulated according to axes of different orientation and types.

According to an embodiment, the information carrier can include several sheets of different shapes and sizes articulated according to axes either of the hinge type parallel to each other or not or of the rotation type with joining pin, allowing the superimposing or moving aside of a transponder from a corresponding shielding element or vice versa. FIG. 10 shows an example of an information carrier with four articulated sheets (A, B, C, D) where the three first sheets A B and C are articulated according to two perpendicular hinges, and in which the last sheet D is articulated according to a rotating axis.

The invention claimed is:

1. Portable information carrier comprising at least two substantially planar parts articulated to each other forming an assembly in which one part can be superimposed on the other, the first part includes a transponder arranged on the plane of said part, the second part includes a shielding element made up of an electromagnetic conductive sheet that extends over all or part of said part, said transponder intended to be read by means of a suitable reader that transmits an electromagnetic signal activating the transmission of a response from said transponder, wherein said transponder of the first part is positioned facing the shielding element of the second part when both parts are superimposed preventing the activation of the transponder by absorption of the signal transmitted by the reader, said activation being carried out when said parts are moved aside from each other, letting appear the transponder distant from the shielding element.

2. Information carrier according to claim 1, wherein the articulation between two parts consists in an axis forming a hinge, a first part superimposing a second part by putting said first part down by means of said hinge, said two parts form a booklet, each part being of comparable size constituting a sheet of said booklet.

3. Information carrier according to claim 1, wherein the shielding element of the second part occupies a surface at least equivalent to that occupied by the transponder on the first part.

4. Information carrier according to claim 2, wherein the first sheet includes a transponder positioned symmetrically to a shielding element included in the second sheet relatively to the hinge linking the two sheets when said sheets are moved aside and arranged in the same plane.

5. Information carrier according to claim 2, wherein each sheet includes a transponder and a shielding element positioned in such a way that when both sheets are superimposed, the transponders are positioned on a corresponding shielding element of the sheet opposite to that carrying said transponder.

6. Information carrier according to claim 2, comprising a booklet including a plurality of sheets, each sheet including a transponder and a shielding element positioned symmetrically on both side of the hinge, said shielding elements covering the transponders of the superimposed sheets when the booklet is opened by presenting the sheets two at a time and allowing the selective reading of each transponder carried by each opened sheet.

7. Information carrier according to claim 1, wherein the articulation between the two parts is made up of a rotating axis perpendicular to the surface formed by said parts and situated in an area adjacent to the edge of said parts.

8. Information carrier according to claim 7, wherein the first part comprising the transponder rotating around said rotation axis and when superimposed on the second part comprising the shielding element prevents the activation of said transponder and vice versa.

9. Information carrier according to claim 7, wherein the first part comprising the transponder rotating around said rotation axis and when moved aside from the second part comprising the shielding element allows the activation of said transponder and vice versa.

10. Information carrier according to claim 1, comprising several parts of different sizes and shapes articulated each other according to axes forming hinges, which are oriented in different directions.

11. Information carrier according to claim 1, comprising several parts of different sizes and shapes articulated each other according to rotation axes perpendicular to the plane formed by said parts and situated in an area adjacent to the edge of said parts.

12. Information carrier according to claim 1, comprising several parts of different sizes and shapes articulated each other on one hand according to axes forming hinges which are oriented in different directions and on the other hand according to rotation axes perpendicular to the plane formed by said parts and placed in an area adjacent to the edge of said parts.

\* \* \* \* \*